United States Patent [19]

Yokotsuka et al.

[11] Patent Number: 5,268,411
[45] Date of Patent: Dec. 7, 1993

[54] FLUORINE-CONTAINING POLYMER COMPOSITION

[75] Inventors: Shunsuke Yokotsuka; Isamu Kaneko; Kazuya Oharu, all of Yokohama, Japan

[73] Assignee: Asahi Glass Company Ltd., Tokyo, Japan

[21] Appl. No.: 18,561

[22] Filed: Feb. 17, 1993

[51] Int. Cl.⁵ .................. C08K 5/02; C08L 27/12
[52] U.S. Cl. .................. 524/462; 524/544; 524/545; 524/546
[58] Field of Search ............. 524/462, 463, 520, 545, 524/546, 544

[56] References Cited

FOREIGN PATENT DOCUMENTS 0129254  5/1990  Japan .................... 524/462
0252474  11/1991 Japan .................... 524/544

Primary Examiner—Paul R. Michl
Assistant Examiner—Peter Szekely
Attorney, Agent, or Firm—Oblon, Spivak, McClelland, Maier & Neustadt

[57] ABSTRACT

A fluorine-containing polymer composition comprising a solvent containing a block compound composed of a polyfluorinated segment and a hydrocarbon segment and a fluorine-containing polymer having a fluorine-containing aliphatic cyclic structure dissolved in the solvent.

6 Claims, No Drawings

FLUORINE-CONTAINING POLYMER COMPOSITION

BACKGROUND OF THE INVENTION

1. Field of the Invention

The present invention relates to a fluorine-containing polymer composition.

2. Discussion of Background

It is known from Japanese Unexamined Patent Publication No. 129254/1990 that a polymer having a fluorine-containing aliphatic cyclic structure not only shows characteristics of a conventional fluorinated resin but also is soluble in a certain specific solvent. The specific solvent is a perfluoro compound such as perfluoroalkane, a perfluorocyclic ether or a perfluoroalkylamine. By properly selecting the type of the solvent, it is possible to prepare a composition suitable for use under particular coating conditions or drying conditions, and a uniform transparent coating film can be obtained. However, a solution obtainable by such a perfluoro solvent is usually of high viscosity, and there has been a problem that if the polymer concentration in the solution is increased to form a thick film, the viscosity of the solution tends to be very high, whereby defoaming or filtration tends to be difficult.

SUMMARY OF THE INVENTION

It is an object of the present invention to solve the above-mentioned drawbacks inherent to the prior art and to provide a fluorine-containing polymer composition, whereby there will be no substantial increase in the viscosity of the solution even when the polymer concentration is increased, and defoaming or filtration can easily be conducted.

The present inventors have found anew that the polymer having a fluorine-containing aliphatic cyclic structure is soluble not only in the perfluoro compound hitherto known but also in a block compound composed of a polyfluorinated segment and a hydrocarbon segment. Further, it has been found that the viscosity of the solution can be made relatively low when this block compound is used as the solvent.

The present invention has been accomplished on the basis of these discoveries and provides anew a fluorine-containing polymer composition comprising a solvent containing a block compound composed of a polyfluorinated segment and a hydrocarbon segment and a fluorine-containing polymer having a fluorine-containing aliphatic cyclic structure dissolved in the solvent.

DETAILED DESCRIPTION OF THE PREFERRED EMBODIMENTS

In the present invention, when the specific block compound is used as a solvent, the viscosity of the solution at the same concentration can be reduced over the case where the above-mentioned perfluoro compound is used as a solvent, by the effects attributable to the presence of the hydrocarbon unit in the molecule, whereby it is possible to obtain a solvent which is excellent in the operational efficiency from the viewpoint of defoaming, filtration, etc. Otherwise, at the same level of viscosity, the concentration of the solution can be increased, whereby it is possible to obtain a solution excellent in thick coating properties. The concentration of the solution is usually from 1 to 30 wt%, preferably from 1 to 20 wt%.

In the block compound to be used in the present invention, the polyfluorinated segment is a segment having at least two fluorine-bonded carbon atoms linked to one another. Specifically, it includes, for example, a polyfluoroalkyl group having at least two carbon atoms, such as a perfluoroethyl group, a perfluoropropyl group, a perfluorobutyl group or a 1,1,2,2,3,3-hexafluoropropyl group, a polyfluoroalkylene group such as a perfluoroethylene group or a perfluorobutylene group, and a polyfluoroalkenyl group such as $CF_2=CFCF_2CF_2-$. Further, it may be the one partially substituted by a halogen atom such as chlorine or by an oxygen atom.

The hydrocarbon segment is basically a group composed solely of carbon and hydrogen, but may contain a hetero atom such as an ether-type oxygen atom. Specifically, it includes, for example, an alkyl group such as a methyl group, an ethyl group, a propyl group or a butyl group, an alkenyl group such as a vinyl group or an allyl group, and an alkylene group such as an ethylene group or a butylene group. It is especially preferred with a view to reduction of the viscosity of the solution that the hydrocarbon segment has at least two carbon atoms.

The block compound comprises at least one such polyfluorinated segment and at least one such hydrocarbon segment linked to one another. Specifically, its basic structure may, for example, be Rf—Rh, Rf—Rh—Rf or Rh—Rf—Rh wherein Rf represents the polyfluorinated segment and Rh represents the hydrocarbon segment.

From the viewpoint of the solubility of the fluorine-containing polymer, the block compound is preferably such that the total number of carbon atoms constituting the polyfluorinated segment is larger than the total number of carbon atoms constituting the hydrocarbon segment. It is particularly preferred that the total number of carbon atoms constituting the polyfluorinated segment is at least twice the total number of carbon atoms constituting the hydrocarbon segment.

If the total number of carbon atoms is too large, the block compound will no longer be in a liquid state at room temperature, or its boiling point will be so high that it will no longer be suitable as a solvent for coating. The total number of carbon atoms is preferably not larger than 30. Further, if the number of carbon atoms of the polyfluorinated segment is too small, the solubility of the fluorine-containing polymer will be low, such being undesirable. The number of carbon atoms constituting the polyfluorinated segment is preferably at least 6. It is further preferred that the polyfluorinated segment is completely fluorinated.

By properly selecting the combination and types of the polyfluorinated segment and the hydrocarbon segment of the block compound, the boiling point, the viscosity and the solubility can be selected within wide ranges, respectively, and it is accordingly possible to prepare a composition suitable under particular coating conditions or drying conditions and to obtain a uniform coating film having an optional thickness.

Further, the block compound of the present invention may be mixed with a conventional perfluoro solvent such as perfluorotributylamine or perfluoro-2-butyltetrahydrofuran at an optional ratio and can be used as a solvent mixture.

In the present invention, Rf-Rh wherein Rf is a $C_{6-12}$ perfluoroalkyl group, and Rh is a $C_{1-4}$ alkyl group or a $C_{2-4}$ alkenyl group, may be mentioned as a preferred block compound. Here, the Rh segment is not particularly limited so long as it is the one having from 1 to 4 carbon atoms, and it may, for example, be —CH$_3$, —CH$_2$CH$_3$, —CH=CH$_2$, —CH$_2$CH=CH$_2$, —CH=CHCH$_3$, —C(CH$_3$)=CH$_2$, —CH$_2$CH$_2$CH$_3$, —CH$_2$CH$_2$CH=CH$_2$, —CH$_2$CH=CHCH$_3$, —CH=CHCH$_2$CH$_3$ or —CH$_2$CH$_2$CH$_2$CH$_3$.

Such a compound may be synthesized, for example, as follows:

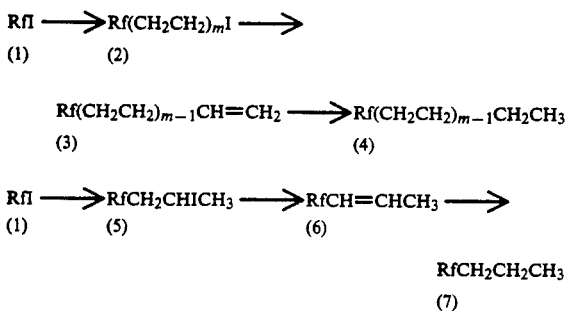

Namely, compound (2) (m=1 or 2) can be obtained by reacting compound (1) with ethylene in the presence of a radical initiator. Here, when the pressure of ethylene is at a level of from 3 to 8 kg/cm$^2$.G, a 1 mol adduct is selectively produced. When the pressure of ethylene is at a level of from 20 to 25 kg/cm$^2$.G, a 2 mol adduct will be formed as the main product. Compound (3) can be quantitatively obtained by heating and stirring compound (2) and a basic aqueous solution in the presence of a phase transfer catalyst. Compound (4) can be obtained by hydrogenating compound (3) in the present of a hydrogenation catalyst such as Raney nickel.

Compound (5) can be obtained by reacting compound (1) with propylene in the presence of a radical initiator. Compound (6) can quantitatively be obtained by heating and stirring compound (5) and a basic aqueous solution in the presence of a phase transfer catalyst. Compound (7) can be obtained by hydrogenating compound (6) in the presence of a hydrogenation catalyst such as Raney nickel.

Here, the Rf group is a C$_{6-12}$ linear or branched perfluoroalkyl group, and the following groups may, for example, be mentioned:

CF$_3$(CF$_2$)$_n$— (n = 5 to 11), (CF$_3$)$_2$CF(CF$_2$)$_m$— (m = 3 to 9),

CF$_3$CF$_2$CF(CF$_3$)(CF$_2$)$_k$— (k = 2 to 8), (CF$_3$CF$_2$)$_2$CF(CF$_2$)$_p$— (p = 1 to 7),

The polymer having a fluorine-containing aliphatic cyclic structure includes a wide range of such polymers including known or well known polymers having a cyclic structure in the main chain, which are obtainable by polymerizing a monomer having a fluorine-containing cyclic structure or which are obtainable by cyclic polymerization of a fluorine-containing monomer having at least two polymerizable double bonds.

The polymers having a cyclic structure in the main chain, which are obtainable by cyclic polymerization of a fluorine-containing monomer having at least two polymerizable double bonds, are known, for example, in Japanese Unexamined Patent Publications No. 238111/1988 and No. 238115/1988. Namely, they can be obtained by homopolymerization of a monomer such as perfluoro(allylvinyl ether) or perfluoro(butenylvinyl ether) or by copolymerization of such a monomer with a radical polymerizable monomer such as tetrafluoroethylene.

The polymers having a cyclic structure in the main chain, which are obtainable by polymerizing a monomer having a fluorine-containing cyclic structure, are known, for example, in Japanese Examined Patent Publication No. 18964/1988. Namely, they may be obtained by homopolymerization of a monomer having a fluorine-containing cyclic structure such as perfluoro(2,2-dimethyl-1,3-dioxol), or by copolymerization of such a monomer with a radical-polymerizable monomer such as tetrafluoroethylene.

Further, the fluorine-containing polymer may be a polymer obtainable by copolymerizing a monomer having a fluorine-containing cyclic structure such as perfluoro(2,2-dimethyl-1,3-dioxol) with a fluorine-containing monomer having at least two polymerizable double bonds, such as perfluoro(butenylvinyl ether).

The polymer having a fluorine-containing aliphatic cyclic structure is preferably a polymer having a cyclic structure in the main chain. The one containing at least 20 mol% of a cyclic structure is preferred from the viewpoint of the transparency and mechanical properties.

Now, the present invention will be described in further detail with reference to Examples. However, it should be understood that the present invention is by no means restricted by such specific Examples.

PREPARATION EXAMPLE 1

Preparation of a Polymer Having a Fluorine-Containing Aliphatic Cyclic Structure 35 g of perfluorobutenyl vinyl ether, 5 g of R113 1,1,2-trichlorotrifluoroethane), 150 g of deionized water and 90 mg of ((CH$_3$)$_2$CHOCOO)$_2$ as a polymerization initiator, were charged into a pressure resistant glass autoclave having an internal capacity of 200 ml. The interior of the system was flushed three times with nitrogen, and then suspension polymerization was conducted at 40° C. for 22 hours, to obtain 28 g of polymer A. The polymer had a glass transition temperature of 108° C., and it was a glass-like polymer which was tough and transparent at room temperature. Its 10% heat decomposition temperature was 46° C., and its light transmittance was at least 95%.

PREPARATION EXAMPLE 2

Preparation of a Polymer Having a Fluorine-Containing Aliphatic Cyclic Structure Perfluoro(2,2-dimethyl-1,3-dioxol) and tetrafluoroethylene were subjected to radical-copolymerization to obtain copolymer B having a glass transition temperature of 160° C. This polymer was colorless and transparent. The refractive index was 1.3, and the transmittance was also high.

EXAMPLE 1

Polymer A prepared in Preparation Example 1 was dissolved in CF$_3$(CF$_2$)$_7$CH=CH$_2$ (boiling point: 150° C.) and CF$_3$(CF$_2$)$_7$CH$_2$CH$_3$ (boiling point: 155° C.) to obtain solutions having a solid content concentration of 9 wt%, which were designated as compositions A and B, respectively. The viscosities of these solutions are shown in Table 1.

COMPARATIVE EXAMPLE 1

Polymer A was dissolved in a perfluoro solvent Afrude E-16 (perfluorotributylamine, manufactured by Asahi Glass Company Ltd.) (boiling point: 155° C.) having a boiling point close to $CF_3(CF_2)_7CH=CH_2$ and $CF_3(CF_2)_7CH_2CH_3$ used in Example 1, to obtain a solution having a solid content concentration of 9 wt%, which was designated as composition C. The viscosity of this solution is shown in Table 1. This solution was filtered through a membrane filter manufactured by Advantec, whereby the filtration speed was very slow, and clogging was observed. Further, coating onto a glass substrate was conducted by means of a spin coater, whereby inclusion of foams was observed, and it was impossible to obtain a uniform coating film.

Compositions A and B had low viscosities as compared with composition C and were excellent in the operational efficiency such as defoaming or filtration.

TABLE 1

| | Composition | Solvent | Boiling point (°C.) | Viscosity of a 9 wt % solution (cp) |
|---|---|---|---|---|
| Example 1 | A | $CF_3(CF_2)_7CH=CH_2$ | 150 | 300 |
| | B | $CF_3(CF_2)_7CH_2CH_3$ | 155 | 450 |
| Comparative Example 1 | C | Afrude E-16 | 155 | 890 |

EXAMPLE 2

Polymer A was dissolved in $CF_3(CF_2)_5CH_2CH_3$ (boiling point: 116° C.) to obtain a solution having a solid content concentration of 9 wt%, which was designated as composition D. The viscosity of this solution is shown in Table 2.

COMPARATIVE EXAMPLE 2

Polymer A was dissolved in a perfluoro solvent Afrude E-10 (perfluoro-2-butyltetrahydrofuran, manufactured by Asahi Glass Company Ltd.) (boiling point: 100° C.) having a boiling point close to $CF_3(CF_2)_5CH_2CH_3$ used in Example 2, to obtain a solution having a solid content concentration of 9 wt%, which was designated as composition E. The viscosity of this solution is shown in Table 2.

Composition D had a low viscosity as compared with composition E and was excellent in the operational efficiency such as defoaming or filtration.

TABLE 2

| | Composition | Solvent | Boiling point (°C.) | Viscosity of a 9 wt % solution (cp) |
|---|---|---|---|---|
| Example 2 | D | $CF_3(CF_2)_5CH_2CH_3$ | 116 | 90 |
| Comparative Example 2 | E | Afrude E-10 | 100 | 150 |

EXAMPLE 3 AND COMPARATIVE EXAMPLE 3

Using $CF_3(CF_2)_7CH_2CH_3$ and Afrude E-16 as solvents, solutions of polymer A having a viscosity of 250 cp were prepared, which were designated as composition F (Example 3) and composition G (Comparative Example 3), respectively. The solid content concentrations were 8.3 wt% and 6.9 wt%, respectively. Then, using these solutions, coating films were formed on a glass substrate under the following conditions by means of a spin coater.

Film-forming Conditions

Rotational speed of the spin coater: 2,000 rpm
Drying condition: 160° C. for one hour As a result, from composition F, a coating film having a thickness of 1.3 μm was obtained, and from composition G, a coating film having a thickness of 0.8 μm was obtained. Thus, composition F was superior in the thick coating properties.

EXAMPLE 4 AND COMPARATIVE EXAMPLE 4

The operation was conducted in the same manner as in Example 3 and Comparative Example 3 except that polymer A was changed to polymer B, whereby the composition using $CF_3(CF_2)_7CH_2CH_3$, had a higher concentration as a solution than the composition using Afrude E-18 and thus was superior in the thick coating properties.

The fluorine-containing polymer composition of the present invention has an advantage such that it gives a uniform transparent coating film of fluorine resin by coating. Further, by using a compound having a hydrocarbon segment in its molecule, as a solvent, it is possible to accomplish a reduction in the viscosity of a solution as compared with a case where a perfluoro compound is used as a solvent, thus providing a merit that the operational efficiency is thereby improved. Further, at the same viscosity, the concentration of the solid content can be made high, whereby it is possible to obtain a solution excellent in the thick coating properties.

What is claimed is:

1. A fluorine-containing polymer composition comprising a solvent containing a block compound composed of a polyfluorinated segment and a hydrocarbon segment and a fluorine-containing polymer having a fluorine-containing aliphatic cyclic structure dissolved in the solvent.

2. The fluorine-containing polymer composition according to claim 1, wherein the block compound is a block compound of the formula Rf-Rh wherein Rf is a $C_{6-12}$ perfluoroalkyl group, and Rh is a $C_{1-4}$ alkyl group or a $C_{2-4}$ alkenyl group.

3. The fluorine-containing polymer composition according to claim 1, wherein the block compound is $CF_3(CF_2)_7CH=CH_2$, $CF_3(CF_2)_7CH_2CH_3$ or $CF_3(CF_2)_5CH_2CH_3$.

4. The fluorine-containing polymer composition according to claim 1, wherein the fluorine-containing polymer is the one containing at least 20 mol % of a fluorine-containing aliphatic cyclic structure in the main chain.

5. The fluorine-containing polymer composition according to claim 1, wherein the fluorine-containing polymer is a homopolymer of a monomer having a fluorine-containing cyclic structure, or a copolymer of such a monomer with a radical-polymerizable monomer.

6. The fluorine-containing polymer composition according to claim 1, wherein the fluorine-containing polymer is the one obtained by cyclic polymerization of a fluorine-containing monomer having at least two polymerizable double bonds.

* * * * *